(12) United States Patent
Kopplin et al.

(10) Patent No.: US 12,631,285 B2
(45) Date of Patent: May 19, 2026

---

(54) INSULATED COUPLING

(71) Applicant: MANN TEKNIK AB, Mariestad (SE)

(72) Inventors: Gerhard Kopplin, Mariestad (SE);
Markus Bäckström, Mariestad (SE)

(73) Assignee: MANN TEKNIK AB, Mariestad (SE)

( * ) Notice: Subject to any disclaimer, the term of this patent is extended or adjusted under 35 U.S.C. 154(b) by 146 days.

(21) Appl. No.: 18/557,100

(22) PCT Filed: Sep. 20, 2022

(86) PCT No.: PCT/SE2022/050827
§ 371 (c)(1),
(2) Date: Oct. 25, 2023

(87) PCT Pub. No.: WO2023/048619
PCT Pub. Date: Mar. 30, 2023

(65) Prior Publication Data
US 2024/0209977 A1 Jun. 27, 2024

(30) Foreign Application Priority Data

Sep. 21, 2021 (SE) .................................... 2151154-8

(51) Int. Cl.
F16L 59/14 (2006.01)
F16L 37/36 (2006.01)
F16L 39/00 (2006.01)
F16L 59/065 (2006.01)
F16L 59/18 (2006.01)

(52) U.S. Cl.
CPC ............. F16L 59/141 (2013.01); F16L 37/36 (2013.01); F16L 39/005 (2013.01); F16L
*59/065* (2013.01); *F16L 59/182* (2013.01); *F16L 2201/20* (2013.01)

(58) Field of Classification Search
CPC ......... F16L 59/14; F16L 39/00; F16L 59/141; F16L 37/36; F16L 59/065; F16L 39/005; F16L 59/182
See application file for complete search history.

(56) References Cited

U.S. PATENT DOCUMENTS

| | | | |
|---|---|---|---|
| 3,152,452 A | 10/1964 | Bond | |
| 5,253,675 A | 10/1993 | Ooshio | |
| 5,791,366 A | 8/1998 | Lo | |

(Continued)

FOREIGN PATENT DOCUMENTS

| | | |
|---|---|---|
| CN | 110848562 | 2/2020 |
| DE | 102015209124 | 11/2016 |

(Continued)

*Primary Examiner* — William C Doerrler
(74) *Attorney, Agent, or Firm* — DUANE MORRIS LLP; Gregory M. Lefkowitz; Daniel J. Tarr

(57) ABSTRACT

A coupling (1) comprising a first (11) and second (12) elongated part to be coupled to each other by insertion of the first part (11) into the second part (12). Each part (11, 12) comprises an internal liquefied gas conduit (11a, 12a) to be fluidly connected at a connection point (10) for transfer of liquefied gas through the coupling (1). The first part (11) or the second part (12) comprises a warm seal (2) and the second part (12) comprises a purge opening (4). By providing a locking device (6) with two positions, a safe and reliable coupling is provided.

20 Claims, 3 Drawing Sheets

(56)                    References Cited

U.S. PATENT DOCUMENTS

| | | | |
|---|---|---|---|
| 7,052,047 B1 * | 5/2006 | Box | F16L 59/184 |
| | | | 62/50.7 |
| 8,267,433 B2 * | 9/2012 | Lange | F16L 39/005 |
| | | | 62/50.7 |
| 2005/0247352 A1 | 11/2005 | Kamiya | |
| 2006/0038401 A1 | 2/2006 | Kleinbeckel | |
| 2008/0169037 A1 | 7/2008 | Ziegler | |
| 2009/0261578 A1 | 10/2009 | Lange | |
| 2009/0327372 A1 | 12/2009 | Ylonen | |
| 2016/0356510 A1 | 12/2016 | Wang | |
| 2016/0369923 A1 | 12/2016 | Danelli | |
| 2018/0038651 A1 | 2/2018 | Frenal | |
| 2019/0154065 A1 | 5/2019 | Tiberghien | |
| 2020/0318768 A1 * | 10/2020 | Tickle | F16L 37/36 |
| 2022/0282837 A1 * | 9/2022 | Gustafson | F16L 37/248 |

FOREIGN PATENT DOCUMENTS

| | | |
|---|---|---|
| EP | 0657674 | 6/1995 |
| EP | 1472486 | 11/2004 |
| EP | 3670999 | 6/2020 |
| GB | 1399059 | 6/1975 |

* cited by examiner

Fig. 3a                    Fig. 3b

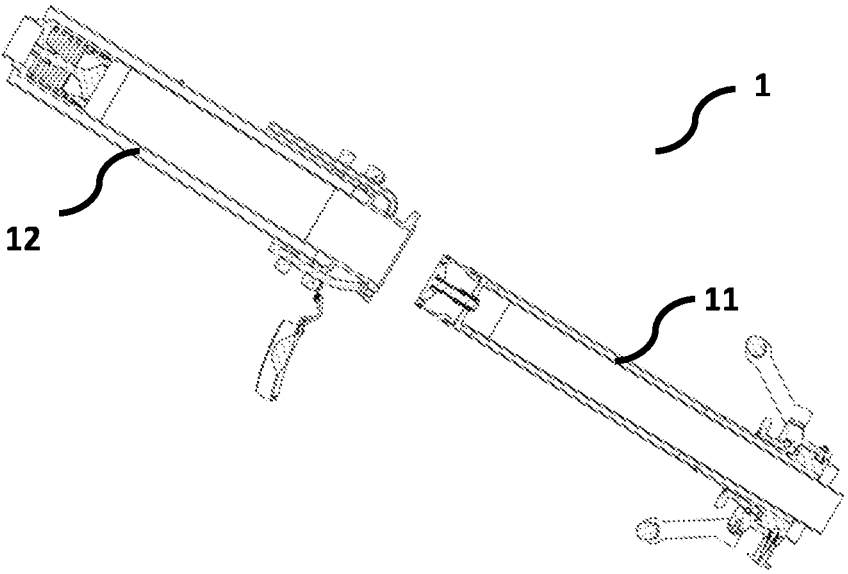
Fig. 5
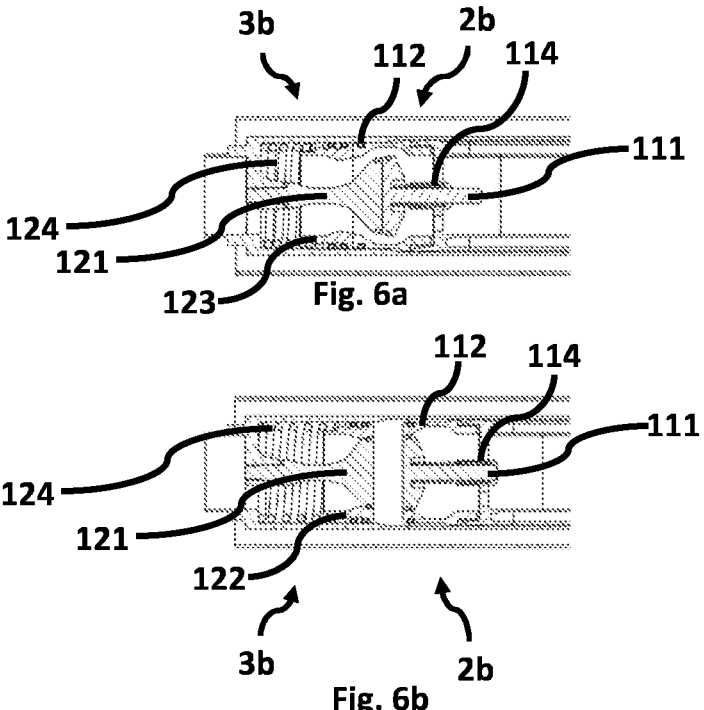
Fig. 6a
Fig. 6b

INSULATED COUPLING

CROSS-REFERENCE TO RELATED APPLICATIONS

This application is a § 371 national stage entry of International Application No. PCT/SE2022/050827, filed Sep. 20, 2022, which claims priority to Sweden Application No. 2151154-8, filed Sep. 21, 2021, the entire contents of which are incorporated herein by reference.

TECHNICAL FIELD

The present invention relates to an improved coupling for transfer of liquefied gas enabling secure purging of the volume between a first and second part of the coupling.

BACKGROUND ART

Couplings for liquefied gases, such as liquefied petroleum gas (LPG), liquefied natural gas (LNG), and liquefied nitrogen (LN2) are known in the art. Further, quick connectors are known as Dry Disconnect Couplings in chemical and petrochemical applications, Aviation refueling, loading, and unloading of Liquefied Petroleum Gas (LPG) and also for cryogenic applications like fueling and bunkering of Liquefied Natural Gas (LNG).

Liquified gases are used for different purposes but independent of the purpose efficiency and safety are important factors. To provide one out of many examples, liquified gases may be used as fuel and need to be transferred from for example a fueling station to a truck. Although the transfer as such is well known in the art there are drawbacks in the art not sufficiently addressing safety issues in cryogenic applications. Storing gas in a liquid state in general requires less space than storage in its gas form. However, in cryogenic applications liquefied gases vaporize long before outdoor or indoor temperatures and variations in temperature could quickly become dangerous. One example is Liquid hydrogen (LH2) that at atmospheric pressure needs to be maintained below approximately –253° C. to stay in a liquid state.

When transferring liquified gas, couplings are a critical and vulnerable component where thermal bridges and dead spaces containing for example air and other pollutions exists in the prior art. For cryogenic applications, various couplings are known, for example Johnston type couplings and other types of vacuum-insulated couplings to partly address the issue.

When transferring liquid hydrogen at –253° C., all other gases become already solid, except helium. The disadvantage with the vacuum insulated couplings is that they do not have valves which means they are open to the atmosphere. To avoid the air in the transfer line become solid, it needs to be removed, before applying liquid hydrogen. This requires a high amount of expensive purge gas. After transfer, the hydrogen needs to be removed from the transfer line before safe connection is possible.

SUMMARY OF INVENTION

An object of the present solution is to offer a quick and safe coupling used for loading and unloading of liquefied gas without spillage and where reliability and safety are of prime concern, as well as a method for quick and safe coupling.

Another object of the present solution is to enable safe operation of the coupling without minimum requirements of knowledge from the operator.

Another object of the present solution is to prevent the coupling from being operated from a full disconnected state to a fully connected state in one movement.

Another object of the present solution is to enable safe and effective purging of the coupling.

Yet another object of the present solution is to enhance the safety at disconnection of the coupling.

The solution is based on the idea of providing vacuum insulation and integrated shut-off valves for minimizing the amount of gas, which needs to be purged before and after the operation. Thus, the solution relates to a coupling comprising a first and second elongated part to be coupled to each other by insertion of the first part into the second part, each part comprises an internal liquefied gas conduit to be fluidly connected at a connection point for transfer of liquefied gas, preferably liquefied hydrogen or helium, through the coupling, one of the first part and the second part comprises a warm seal and the second part comprises a purge opening, the coupling further comprising a cold seal arranged to seal a volume between the cold seal and the warm seal from the internal liquefied gas conduits, the coupling being characterized in that the warm seal is arranged to seal a space between the first and second parts from the atmosphere, the coupling further comprising a locking device with a first and second lock position wherein, in the first lock position, the first part is partly inserted into the second part such that a space is formed between the first and second parts, and the warm seal is engaged such that the purge opening is located between the space and the warm seal enabling purging of a volume between the first and second parts; in the second lock position the first part is fully inserted into the second part forming a fluid connection at the connection point.

In a preferred embodiment, the warm seal is engaged such that the warm seal is between the purge opening and the connection point, and the warm seal is engaged such that the warm seal is located between the purge opening and the connection point.

In a preferred embodiment, the distance between the purge opening and the connection point is longer than the distance between the warm seal and the connection point when the coupling is fully connected.

One advantage with the present solution is that the coupling arrangement provides a secure purge position wherein it is safe to purge the volume between the first and second coupling part. Another advantage is that the volume between the valve arrangements of the first coupling part and the second coupling part can be purged at the same time.

According to one embodiment the warm and cold seals are annual seals.

It is one advantage with the present solution that a vacuum insulation is achieved by sealing a volume between the warm and cold seal.

According to one embodiment, in the first lock position the cold seal is disengaged such that a purge path is open between the first and second parts to the purge opening, and in the second lock position the cold seal is engaged creating a closed volume between the cold seal and warm seal.

According to one embodiment the locking device comprises an actuatable lock preventing the coupling from passing the first lock position without actuation of the lock.

It is one advantage with the present solution that the first lock position is mandatory for the user, the coupling is in one embodiment not possible to connect without stopping at this position. In another embodiment the coupling is not possible to connect or disconnect without stopping in the first lock position.

According to one embodiment the first and second parts further comprise valve arrangements with at least one valve arranged in the first and second parts, the valves permit the liquefied gas to flow through the internal liquefied gas conduits when the first and second liquid conduits are connected, and prevent flow when the first and second liquid conduits are apart.

It is one advantage with the present solution that the entire coupling may comprise only one valve at each side, the reason for this is that the warm and cold seal creates additional safety barriers. Further, by introducing the first lock position disabling complete disconnection of the coupling without a soft or hard stop in the purging position, leakage in any one of the valve arrangements may be detected via the purge opening before complete disconnection.

According to one embodiment the coupling further comprises an emergency release device.

According to one embodiment the coupling comprise a powered emergency release coupling powered by any one of pneumatics, hydraulics, or electric cylinders. According to one embodiment the coupling comprises any one of break studs and break pins to enable safe emergency release. According to another embodiment the emergency release device comprises collars that is released to separate the coupling.

According to one embodiment the emergency release device is separate from the locking device such that upon emergency release at least one part of the second part is separated and instead attached to the first part after separation.

According to one embodiment the first part comprises a first valve arrangement with a valve comprising a stem and a valve head, the second part comprise a second valve arrangement with a valve comprising a stem and a valve head, wherein one of said valves is spring-loaded and the other of said valves is arranged in a fixed position in the valve arrangement.

According to one aspect of purging and connecting a first and second elongated part of a coupling, the following steps are performed:

inserting the first part into the second part, purging a volume between the first and second part at a first lock position, further inserting the first part into the second part fully connecting the coupling in a second lock position. The method according to claim 10, the method comprising the additional step of purging the internal liquefied gas conduit (11a, 12a) before transfer of liquefied gas through the coupling (1).

In a preferred embodiment, there is an additional step of purging the internal liquefied gas conduit before transfer of liquefied gas through the coupling. Alternatively or additionally, there is an additional step of purging the internal liquefied gas conduit after transfer of liquefied gas through the coupling.

According to another aspect of the invention, there is provided a coupling comprising a first and second elongated part to be coupled to each other by insertion of the first part into the second part, each part comprises an internal liquefied gas conduit to be fluidly connected at a connection point for transfer of liquefied gas, preferably liquefied hydrogen or helium, through the coupling, one of the first part and the second part comprises a warm seal and the second part comprises a purge opening, the coupling further comprising a cold seal arranged to seal a volume between the cold seal and the warm seal from the internal liquefied gas conduits, the coupling being characterized in that the distance between the purge opening and the connection point is longer than the distance between the warm seal and the connection point when the coupling is fully connected.

BRIEF DESCRIPTION OF DRAWINGS

The invention is now described, by way of example, with reference to the accompanying drawings, in which:

FIG. 3a shows a section of the cold seal in the second lock position.

FIG. 3b shows a section of the warm seal and its position relative the purge opening in the second lock position.

FIG. 5 shows an embodiment wherein an emergency release device has been released and separation of the first and second coupling parts is completed.

FIG. 6 shows a detailed view of one embodiment of the valve arrangements.

DESCRIPTION OF EMBODIMENTS

In the following, a detailed description of the different embodiments of the solution is disclosed under reference to the accompanying drawings. All examples herein should be seen as part of the general description and are therefore possible to combine in any way of general terms. Individual features of the various embodiments and aspects may be combined or exchanged unless such combination or exchange is clearly contradictory to the overall function of the device or method.

Figures 1, 2, 2A, 2B:
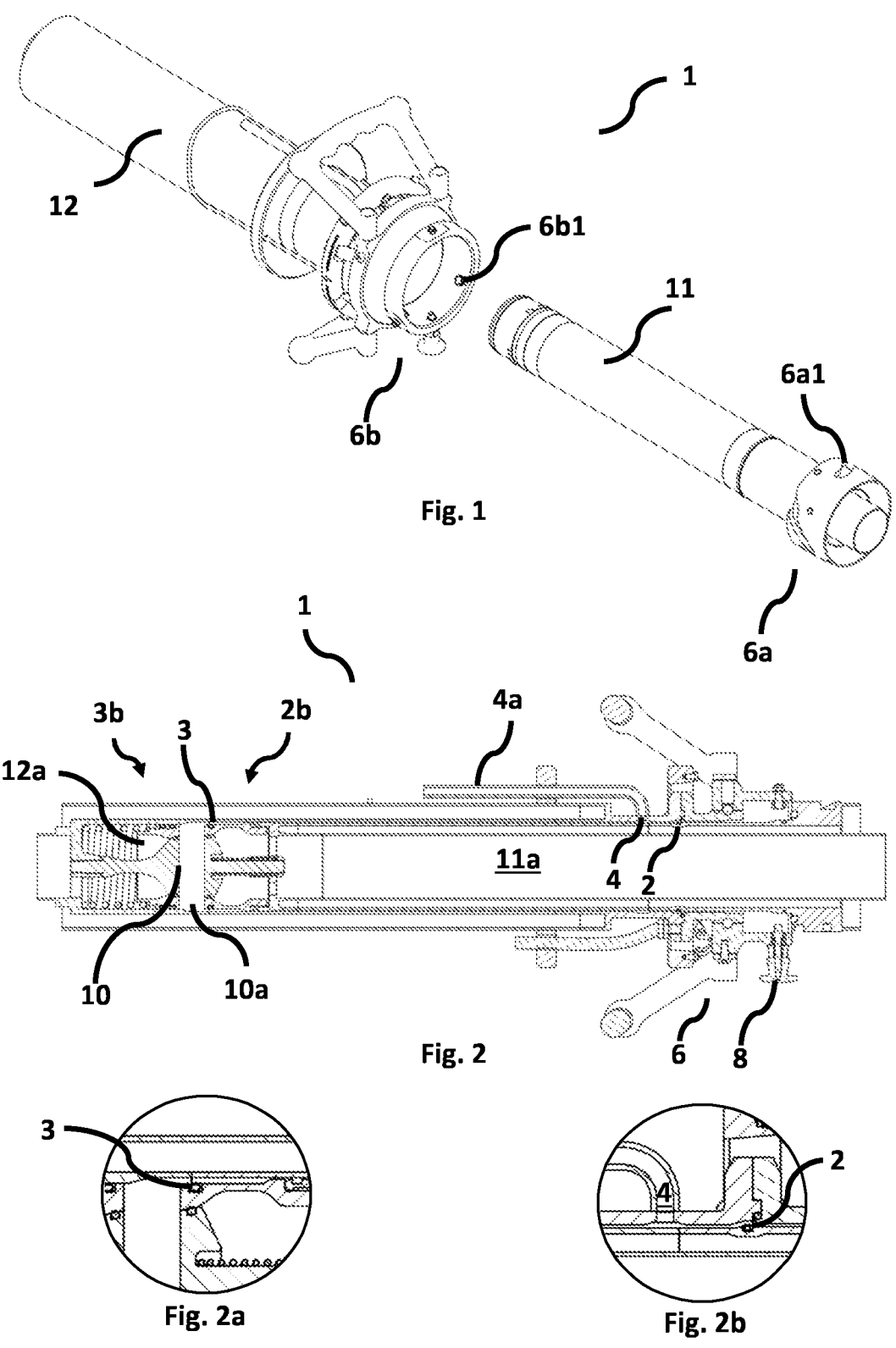
FIG. 1 shows a coupling according to one embodiment wherein the first and second parts are separated.
FIG. 2 shows a coupling according to one embodiment in a situation where the coupling is in a first lock position wherein purging of the volume between the first and second parts is possible.
FIG. 2a sows a section of the cold seal in the first lock position.
FIG. 2b shows a section of the warm seal and its position relative the purge opening in the first lock position.

FIG. 1 illustrates one embodiment of a coupling 1 wherein the first part 11 and second part 12 are shown. In the illustration of FIG. 1 the parts 11 and 12 are not coupled. The first part 11 is a male part and the second part 12 is a female part, wherein the first part is adapted for insertion into the second part. In a typical application, the first part 11 is mostly installed on a vehicle, fuel tank, bunker vessel, or any other suitable unit for receiving the liquefied gas. The second part 12 is most likely installed on a fuel station, transport unit, rail car, tank truck, or similar unit for dispatching the liquefied gas. However, as understood other arrangements are also possible within the scope of the solution as described herein.

FIG. 1 further illustrates one embodiment of the solution wherein the coupling 1 is engaged by align rollers 6b1 to the entrances of a cam curves 6a1. This solution provides distinctive steps to achieve the first and second lock positions, however it should be noted that other solutions are possible as well.

In one embodiment as illustrated in FIG. 1 the user pulls the locking device button and push the second part 12 being hose unit forward to engage the rollers into the cam curve. Then turn for example 5 to 10 degrees until the locking device will lock into a locking hole. The rollers keep second part 12 connected to the first part 11 in the first lock position, also called the purge position. A locking pin is locking in the locking hole. To proceed after purge, pull the locking device button and turn for example an additional 20-50 degrees until the rollers stop rotation in the second lock position. In the process the valves slowly open and the locking device will lock into the second locking hole and connection between the liquefied gas conduits is completed.

As further illustrated in the embodiment of FIG. 1, the first section 6a of the locking device 6 comprises a number of cam curves 6a1 and the second section 6b of the locking device 6 comprises a number of rollers 6b1. Each curve 6a1 gets into contact with a roller 6b1 when the sections 6a and 6b of the locking device 6 are in contact with each other. The sections 6a and 6b are turned in relation to each other and each roller 6b1 will run in respective cam curve 6a1 until they, and the locking device 6, reach a first lock position. This is a purge position and in one embodiment movement out of the first lock position is prevented by an actuator 6e. If actuated, the actuator 6e allows further movement, either towards disconnection or towards the second lock position.

When the sections 6a and 6b is turned further in relation to each other, each roller 6b1 will continue to run in respective cam curve 6a1 until they reach a final stop end position, the second lock position. When the looking device 6 is in this stop position the actuator 6e of the locking device 6 in one embodiment comes into an end position and locks the first part 11 and the second part 12 of the coupling 1 to each other. The actuator 6e can for example be a pin on the second section 6b of the locking device 6 getting into cooperation with a hole on the first second 6a of the locking device 6. In other embodiments the movement is restricted in other ways. The locking device 6 can have another design and can be forced into the two positions in any way suitable.

FIG. 2 illustrates the coupling 1 and how it as has a double wall, vacuum insulated, design to avoid condensation of air at the outside and to reduce thermal bridges in the coupling 1. The first part 2 of the coupling 1 comprises a valve arrangement 2b comprising a valve element and a valve guide having a valve seat. The second part 12 of the coupling 1 also comprises a valve arrangement 3b comprising a valve element and a valve guide having a valve seat.

The first 11 and second 12 parts each has an elongated form and comprises an internal liquefied gas conduit 11a and 12a for transporting the liquefied gas through the coupling 1 when the parts 11 and 12 are coupled. The elongation makes it possible to keep control of the temperature of the liquefied gas passing inside the first part 11 and the second part 12 and to hinder temperature increase of the gas, this is achieved by a volume between the warm 2 and cold 3 seals, see FIG. 3.

Upon insertion of the first part 11 into the second part 12 air, moisture, and other pollutants for cryogenic environments is present around the coupling 1 and trapped between the first 11 and second 12 parts. This problem is in the prior art often reduced by minimizing dead space between valves in couplings, however this only reduces the problem. To eliminate air and contaminations in the present solution, the coupling is halted at the first lock position before the coupling is fully connected leaving a space 10a between the valve arrangements 2b, 3b and also a space between the elongated parts of the first and second parts 11, 12. At this stage the cold seal 3 is not engaged, it is located at a distance from in this embodiment the second part. The space 10a is enclosed by the first 11 and second 12 parts and sealed off by the warm seal from the atmosphere. Thus, FIG. 2 illustrates the first lock position wherein the first part 11 and the second part 12 are connected, the warm seal 2 is engaged but the cold seal 3 is not engaged. Further, this state allows for a space 10a to be formed in the vicinity of the connection point 10 and between the valve arrangements 2b, 3b.

In the first lock position as illustrated in FIG. 2 it is thus possible to purge both the volume between the valve arrangements 2b, 3b and the volume between the first part 11 and the second part 12. This is in one embodiment achieved through releasing small amounts of liquefied gas via internal liquefied gas conduit 11a, 12a, the liquefied gas enters the space 10a and passes out around the first part 11 and out of the coupling via the purge opening 4. The warm seal 2 prevents liquefied gas from entering the atmosphere and the purge opening 4 could for example in one embodiment be attached to a purge return pipe 4a, returning the liquefied gas to a distribution system or another suitable storage.

FIG. 2a illustrates a section of the cold seal 3 and shows how it is not engaged to seal between the first and second parts. Instead, a distance exists between the first and second part opening the volume towards the purge opening 4.

FIG. 2b illustrates a section of the purge opening 4 and the warm seal 2 and how they are arranged in relation to each other in the first lock position.

Figures 3, 4:
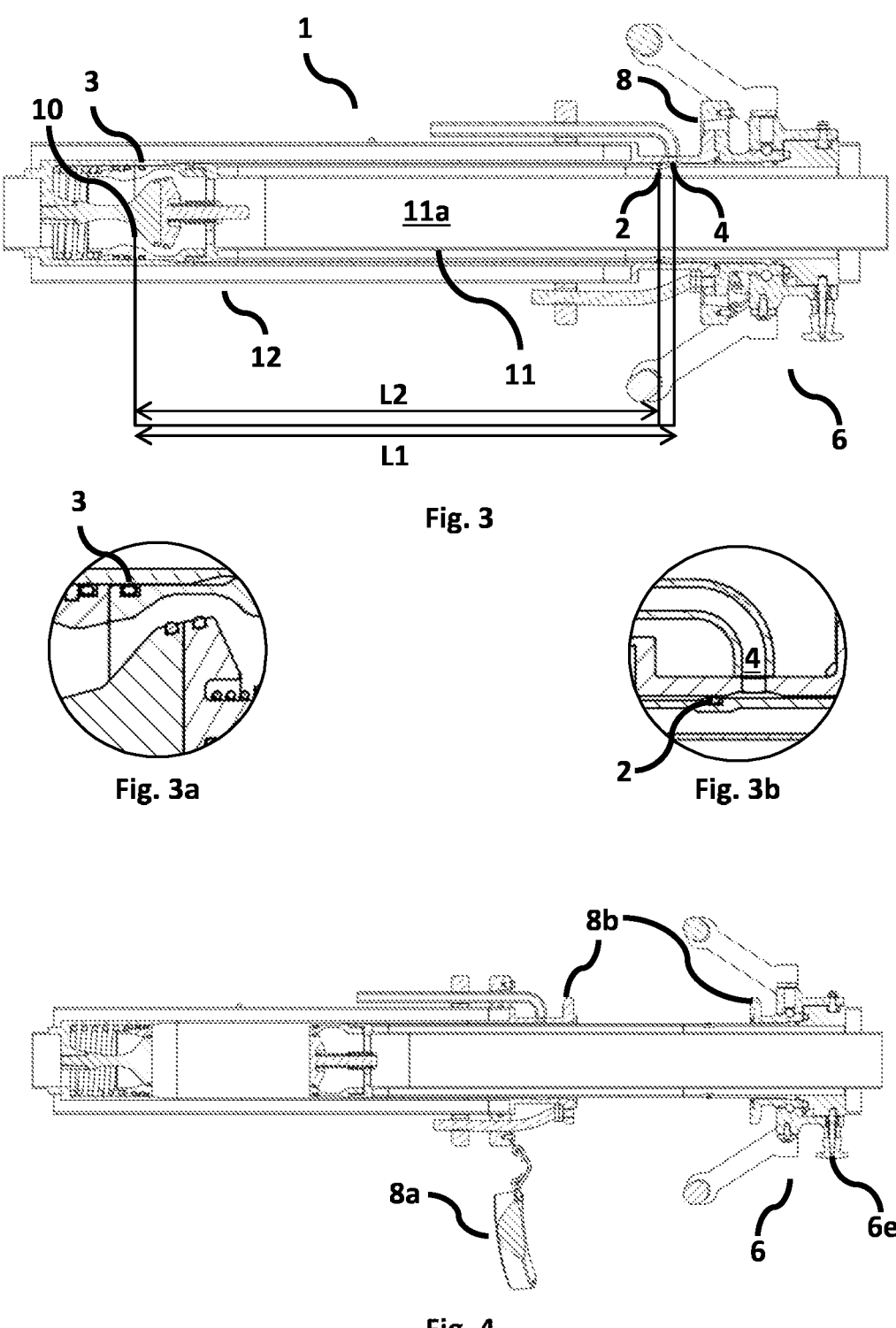
FIG. 3 shows a coupling according to one embodiment where the coupling is in a second lock position and transfer of liquefied gas through the coupling is enabled.
FIG. 4 shows a coupling in wherein the emergency release device has been released.

FIG. 3 illustrates one embodiment of the coupling 1 wherein the first part 11 and the second part 12 of the coupling 1 are fully coupled together in the second lock position permitting the liquefied gas to flow from the conduit 2a of the first part 11 to the conduit 12a of the second part 12 of the coupling 1. When the first part 2 and the second part 3 of the coupling 1 are apart, see for example FIG. 1, at least one valve element is urged into the corresponding valve seat preventing the flow of liquefied gas through the respective liquefied gas conduit 11a and 12a.

In one embodiment, the coupling 1 comprises a second warm seal protecting and sealing the coupling 1 from the atmosphere. The second warm seal further seals the purge opening 4 from the atmosphere in the second lock position wherein the purge opening 4 is between the warm seal 2 and the second warm seal.

FIG. 3 further illustrates how the first 11 and second parts 12 seal the liquefied gas conduit from the outside by the cold seal 3 and the warm seal 2. The warm seal 2 further seals the purge opening 4 preventing any leakage even if the cold seal 3 would fail.

FIG. 3a illustrates a section of the cold seal 3 and shows how it is engaged in the second lock position to seal between the first and second parts, compare with FIG. 2a.

FIG. 3b illustrates a section of the purge opening 4 and the warm seal 2 and how they are arranged in relation to each other in the second lock position, compare with FIG. 2b.

FIG. 4 illustrates one embodiment of the coupling 1 wherein an emergency release device 8 has released the first 11 and second 12 parts from engagement. As shown in FIG. 4, the emergency release device 8 separates the first and second parts at a different position than at usual operation, as illustrated parts of the second part 12 are still connected to the first part 11. This enables that the emergency release device 8 overrides the requirement for the coupling 1 to halt in the first lock position. The work of the emergency release device 8 result in an emergency shut down that stops the flow of the liquefied gas. The emergency shut down will separate the first part 2 of the coupling 1 from the second part 3 of the coupling 1 to prevent damage of the transfer system.

The emergency release device 8 comprises elements attached to the second part 12 of the coupling 1. When the coupling 1 is exposed to determined unwanted load or angles, the elements of the emergency release device 8 is activated.

In one embodiment, when there is a need to disconnect the coupling 1, a wire attached to a release ring is stretched. Then the release ring is pulled off from the clamp construction 8a that then will loose the grip around the flange 8b and be pushed outwards by a conical part of the flange 8b. The parts of the second part 12 of the coupling 1 will slide off from the first part 2, away from the locking device 6. A stop flange on the outside of the second part 12 of the coupling 1 stops the movement of the release ring along the elongated body of the second part 12 of the coupling 1. The valve arrangements 2b and 3b will be closed before the cold seal 4 disengages.

The emergency release device 8 can have another design and can be forced into action in any way suitable. For example, a power emergency release coupling, break studs, break pins, or any other suitable solution.

FIG. 5 illustrates one embodiment of a coupling 1 that has been completely released by the emergency release device 8.

FIGS. 6a and 6b illustrate one embodiment of valve arrangements 2b, 3b, wherein FIG. 6a illustrates the valve arrangements 2b, 3b in the second lock position and FIG. 6b in the first lock position. Each of the valve arrangements 2b, 3b comprises a valve 111, 121, valve seat inserts 112, 122, and springs 114, 124 enabling that each valve arrangement 2b, 3b is brought from a closed to an open state. The valve seat 123 of the second part 12 is in the illustrated embodiment spring loaded by the spring 124. The valve 121 of the second part is fixed in its position. The valve seat 112 of the first part 11 is fixed in its position and the valve 111 of the first part 11 is spring loaded by the spring 114. This single poppet valve arrangement helps enable effective purging since no dead space between dual valves is required.

In order to remove air from the conduit so avoid the air contaminating the product to be transferred, it is preferred that the internal liquefied gas conduit 11a, 12a is purged before transfer of liquefied gas through the coupling 1. Correspondingly, the internal liquefied gas conduit 11a, 12a is purged after transfer of liquefied gas through the coupling to remove remnants of for example hydrogen, which may mix with air to create a combustible mixture.

Preferred embodiments of a coupling have been described. It will be appreciated that these may be varied within the scope of the appended claims without deviating from the inventive idea. For example, the warm seal has been described as part of the first part 11 but it could also be part of the second part 12.

The invention claimed is:

1. A coupling comprising a first and second elongated part to be coupled to each other by insertion of the first part into the second part, each part comprises an internal liquefied gas conduit to be fluidly connected at a connection point for transfer of liquefied gas, through the coupling, one of the first part and the second part comprises a warm seal and the second part comprises a purge opening, the coupling further comprising a cold seal arranged to seal a volume between the cold seal and the warm seal from the internal liquefied gas conduits, wherein the warm seal is arranged to seal a space between the first and second parts from the atmosphere, the coupling further comprising a locking device with a first and second lock position wherein, in the first lock position, the first part is partly inserted into the second part such that a space is formed between the first and second parts, and the warm seal is engaged such that the purge opening is located between the space and the warm seal enabling purging of a volume between the first and second parts, the cold seal is disengaged such that a purge path is open between the first and second parts to the purge opening, and in the second lock position the first part is fully inserted into the second part forming a fluid connection at the connection point and the cold seal is engaged creating a closed volume between the cold seal and warm seal.

2. The coupling according to claim 1, wherein the warm seal is engaged such that the warm seal is between the purge opening and the connection point.

3. The coupling according to claim 1, wherein the distance between the purge opening and the connection point is longer than the distance between the warm seal and the connection point when the coupling is fully connected.

4. The coupling according to claim 1, wherein the locking device comprises an actuator preventing the coupling from passing the first lock position without actuation of the actuator.

5. The coupling according to claim 1, wherein the first and second parts further comprise a valve arrangement with at least one valve arranged in the first and second parts, the valves permitting the liquefied gas to flow through the internal liquefied gas conduits when the first and second liquid conduits are connected, and preventing flow when the first and second liquid conduits are apart.

6. The coupling according to claim 1, wherein the coupling further comprises an emergency release device.

7. The coupling according to claim 6, wherein the emergency release device is separate from the locking device such that upon emergency release at least one part of the second part is separated and instead attached to the first part after separation.

8. The coupling according to claim 1, wherein the first part comprises a first valve arrangement with a valve comprising a stem and a valve head, the second part comprises a second valve arrangement with a valve comprising a stem and a valve head, wherein one of said valves is spring-loaded and the other of said valves is arranged in a fixed position in the valve arrangement.

9. A method for purging and connecting a first and second elongated part of a coupling according to claim 1, and the method comprises the steps:

inserting the first part into the second part, purging a volume between the first and second part at a first lock position, further inserting the first part into the second part fully connecting the coupling in a second lock position.

10. The method according to claim 9, the method comprising the additional step of purging the internal liquefied gas conduit before transfer of liquefied gas through the coupling.

11. The method according to claim 9, the method comprising the additional step of purging the internal liquefied gas conduit after transfer of liquefied gas through the coupling.

12. A coupling comprising a first and second elongated part to be coupled to each other by insertion of the first part into the second part, each part comprises an internal lique-fied gas conduit to be fluidly connected at a connection point for transfer of liquefied gas through the coupling, one of the first part and the second part comprises a warm seal and the second part comprises a purge opening, the coupling further comprising a cold seal arranged to seal a volume between the cold seal and the warm seal from the internal liquefied gas conduits, wherein the distance (L1) between the purge opening and the connection point is longer than the distance (L2) between the warm seal and the connection point when the coupling is fully connected.

13. A coupling comprising a first and second elongated part to be coupled to each other by insertion of the first part into the second part, each part comprises an internal lique-fied gas conduit to be fluidly connected at a connection point for transfer of liquefied gas, through the coupling, one of the first part and the second part comprises a warm seal and the second part comprises a purge opening, the coupling further comprising a cold seal arranged to seal a volume between the cold seal and the warm seal from the internal liquefied gas conduits, wherein the warm seal is arranged to seal a space between the first and second parts from the atmosphere, the coupling further comprising a locking device with a first and second lock position, wherein the locking device comprises an actuator preventing the coupling from passing the first lock position without actuation of the actuator, wherein, in the first lock position, the first part is partly inserted into the second part such that a space is formed between the first and second parts, and the warm seal is engaged such that the purge opening is located between the space and the warm seal enabling purging of a volume between the first and second parts; and in the second lock position the first part is fully inserted into the second part forming a fluid connection at the connection point.

14. The coupling according to claim 13, wherein the warm seal is engaged such that the warm seal is between the purge opening and the connection point.

15. The coupling according to claim 13, wherein the distance between the purge opening and the connection point is longer than the distance between the warm seal and the connection point when the coupling is fully connected.

16. The coupling according to claim 13, wherein the first and second parts further comprise a valve arrangement with at least one valve arranged in the first and second parts, the valves permitting the liquefied gas to flow through the internal liquefied gas conduits when the first and second liquid conduits are connected, and preventing flow when the first and second liquid conduits are apart.

17. The coupling according to claim 13, wherein the coupling further comprises an emergency release device.

18. The coupling according to claim 17, wherein the emergency release device is separate from the locking device such that upon emergency release at least one part of the second part is separated and instead attached to the first part after separation.

19. The coupling according to claim 13, wherein the first part comprises a first valve arrangement with a valve com-prising a stem and a valve head, the second part comprises a second valve arrangement with a valve comprising a stem and a valve head, wherein one of said valves is spring-loaded and the other of said valves is arranged in a fixed position in the valve arrangement.

20. A method for purging and connecting a first and second elongated part of a coupling according to claim 13, and the method comprises the steps of:

inserting the first part into the second part, purging a volume between the first and second part at a first lock position, and further inserting the first part into the second part fully connecting the coupling in a second lock position.

* * * * *